United States Patent
Villain et al.

(10) Patent No.: US 8,749,442 B2
(45) Date of Patent: Jun. 10, 2014

(54) INTERFACE CIRCUIT

(75) Inventors: Frederic Francois Villain, Caen (FR);
Guillaume Lebailly, Frenouville (FR)

(73) Assignee: NXP, B.V., Eindhoven (NL)

( * ) Notice: Subject to any disclaimer, the term of this patent is extended or adjusted under 35 U.S.C. 154(b) by 215 days.

(21) Appl. No.: 13/345,402

(22) Filed: Jan. 6, 2012

(65) Prior Publication Data
US 2012/0176209 A1 Jul. 12, 2012

(30) Foreign Application Priority Data
Jan. 12, 2011 (EP) .................................. 11150755

(51) Int. Cl.
*H01Q 15/00* (2006.01)

(52) U.S. Cl.
USPC ............................ 343/850; 343/860; 343/876

(58) Field of Classification Search
USPC .................................. 343/850, 852, 860, 876
See application file for complete search history.

(56) References Cited

U.S. PATENT DOCUMENTS

| | | | | |
|---|---|---|---|---|
| 4,939,525 A | * | 7/1990 | Brunner | 343/745 |
| 5,402,133 A | * | 3/1995 | Merenda | 343/701 |
| 5,420,599 A | * | 5/1995 | Erkocevic | 343/828 |
| 5,986,617 A | * | 11/1999 | McLellan | 343/860 |
| 6,606,063 B1 | * | 8/2003 | Merenda | 343/701 |
| 6,628,239 B1 | * | 9/2003 | Hilliard et al. | 343/850 |
| 7,180,465 B2 | * | 2/2007 | Lynch et al. | 343/833 |
| 2009/0046030 A1 | | 2/2009 | Song et al. | |

FOREIGN PATENT DOCUMENTS

| | | |
|---|---|---|
| WO | 2010/052150 A1 | 5/2010 |
| WO | 2010/141774 A2 | 12/2010 |

OTHER PUBLICATIONS

Qiao, D. et al. "Antenna Impedance Mismatch Measurement and Correction for Adaptive CDMA Transceivers", IEEE MIT-S Int'l. Microwave Symposium Digest, pp. 783-786 (Jun. 12, 2005).
Villain, F. et al. "Zero Power Bypass Variable Gain Splitter for TV Tuner", Proc. of the 2009 12$^{th}$ Int'l. Symposium on Integrated Circuits, pp. 389-392 (Dec. 2009).
Extended European Search Report for European Patent Appln. No. 11150755.4 (Jul. 7, 2011).

* cited by examiner

*Primary Examiner* — Tho G Phan

(57) ABSTRACT

Presented is an interface circuit for connecting a RF antenna to a RF device. The interface circuit comprises: a first terminal adapted to connect to the RF antenna; a second terminal adapted to connect to the RF device; an inductive load connected to the second terminal; a first switch adapted to connect the inductive load to the first terminal; and a resistive load connected to the second terminal via a second switch.

11 Claims, 4 Drawing Sheets

INTERFACE CIRCUIT

CROSS-REFERENCE TO RELATED APPLICATIONS

This application claims the priority under 35 U.S.C. §119 of European patent application no. 11150755.4, filed on Jan. 12, 2011, the contents of which are incorporated by reference herein.

This invention relates to an interface circuit for connecting a radio frequency (RF) antenna to a RF device.

Regulatory bodies in various countries have identified that most of the radio frequency spectrum was inefficiently utilized. For example, cellular network bands are overloaded in most parts of the world, but amateur radio and paging frequencies are not. Moreover, fixed spectrum allocation prevents rarely used frequencies (those assigned to specific services) from being used by unlicensed users, even when their transmissions would not interfere at all with the assigned service.

For this reason, unlicensed users have been allowed to utilize licensed bands whenever it would not cause any interference (by avoiding them whenever legitimate user presence is sensed). This paradigm for wireless communication is known as cognitive radio.

Cognitive Radio (CR) is a therefore a paradigm for wireless communication in which either a network or a wireless node changes its transmission or reception parameters to communicate efficiently whilst avoiding interference with licensed or unlicensed users. The alteration of communication parameters is typically based on the active monitoring of several factors in the external and internal radio environment, such as radio frequency spectrum, user behaviour and network state.

Thus, a CR communication device may need to sense the spectrum by detecting the unused spectrum and sharing it without harmful interference with other users.

Depending on the knowledge level of the CR equipment to address the telecommunication signal, many detection techniques may be considered. Among them, energy detection is the most straight forward technique to sense if the spectrum is busy or vacant. This sub-optimal technique has been extensively used in radiometry and involves a squaring device, an integrator and comparator. It can be implemented either in time domain or in frequency domain. In frequency domain implementation, after front end band pass filtering, the received signal samples are converted to frequency domain samples using Fourier transform. Signal detection is then effected by comparing the energy of signal samples falling within certain frequency band with that of a threshold value (representing an ambient noise power arising from the receiver itself and RF interference in the surrounding, for example).

Determination of the threshold value may be an important consideration and, for a targeted threshold value, accurate knowledge of the noise level $N_0$ may be required. The noise is typically an aggregation of various sources including not only thermal noise but also interference. Moreover, noise can vary over time due to gain change, temperature, filtering and generally any impairment of the receiver path.

To estimate the noise due to the transmitter/receiver itself, it is known to add a switching element on a known noise source to the antenna front end of the RF device. For example, estimation of the noise of a RF receiver can be achieved by using a Single Pole, Double Throw (SPDT) switch 10 arranged to disconnect the antenna 12 and switch the RF receiver 16 to an internal load (Rload) 18 as shown in FIG. 1. The noise can then be calibrated on this load. In such a conventional receiver path, it is common to employ a power detector 20 at the input of the RF device 16 as illustrated in FIG. 1.

However, the requirement of a Single Pole, Double Throw (SPDT) switch for noise calibration creates insertion loss and thus, additional noise impact. A typical value for this added loss is approximately 0.8 dB and so it directly impacts directly the noise figure.

Proposed is a new front end or interface architecture which enables the reception and transmission of broadband RF signals. It is proposed to use a pseudo transmission line loaded by a resistor allowing estimation of the noise of the RF transmitter/receiver which is useful for a sensing feature required for cognitive radio (CR). Compared to the known conventional approach, embodiments may save one external SPDT switch and one resistor. Embodiments may also allow the connection of both receiver and transmitter part on the same line to provide an additional saving of another SPDT switch.

Embodiments may help to improve the noise figure of the RF device and thus, sensitivity of the communication system.

According to an aspect of the invention there is provided an interface circuit for connecting a RF antenna to a RF device comprising: a first terminal adapted to connect to the RF antenna; a second terminal adapted to connect to the RF device; an inductive load connected to the second terminal; a first switch adapted to connect the inductive load to the first terminal; and a resistive load connected to the second terminal via a second switch.

The RF device may be a RF transmitter, RF receiver, or a RF transceiver.

The inductive load may comprise a plurality of inductors connected in series.

The first and second switches may each comprise a Single Pole Single Throw (SPST) switch.

According to another aspect of the invention there is provided a RF device comprising an interface circuit according to the invention.

Examples of the invention will now be described in detail with reference to the accompanying drawings, in which.

The same reference numbers have been used in different figures to denote the same components and layers, and the description is not repeated.

The proposed invention is based on the aggregation of the different functions that may useful for a broadband CR device in general. Such combined functions include: noise switching calibration for CR; broadband matching; and simplified half-duplex communication. Embodiments may provide such functionality whilst minimizing the noise figure by reducing the number of SPDT switches that are employed.

Figure 1:
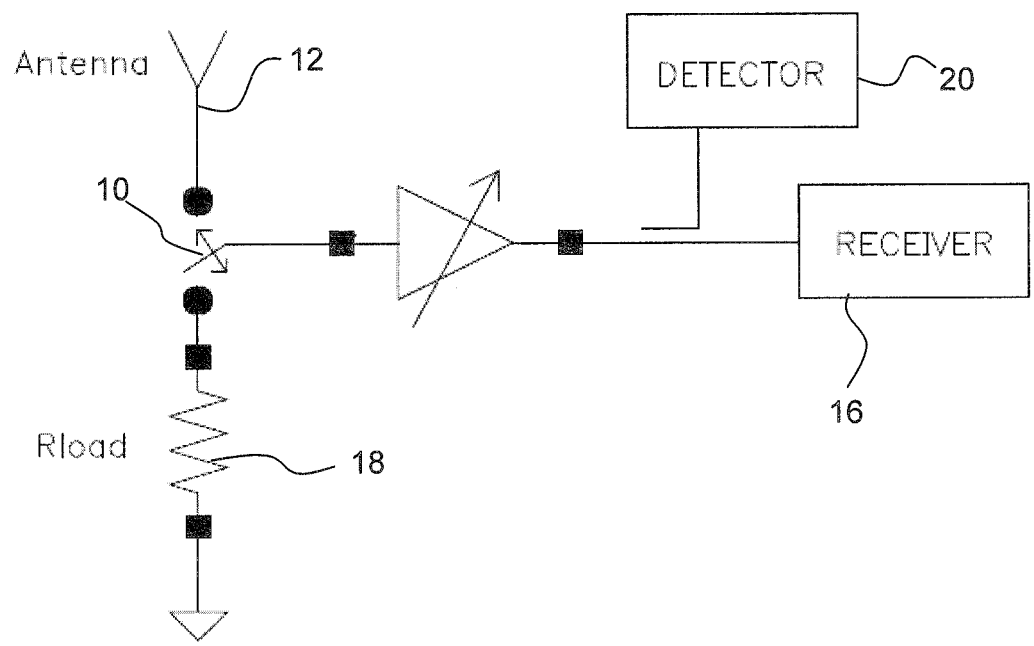
FIG. 1 is a schematic diagram of a conventional front end for a RF device.
Figure 2:
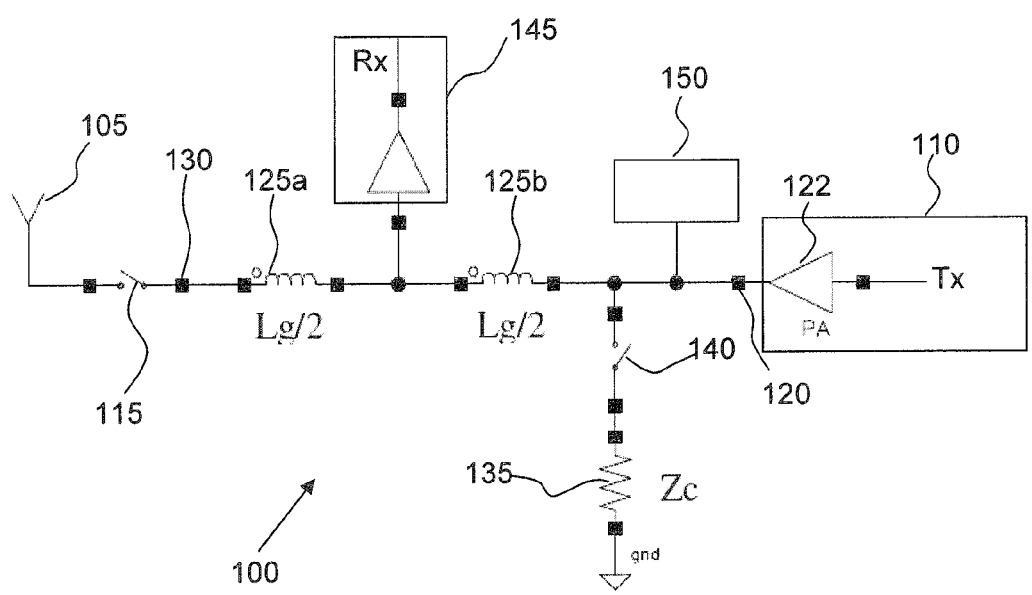
FIG. 2 is a schematic diagram of an interface circuit for connecting a RF antenna to a RF transceiver according to an embodiment of the invention.

Referring to FIG. 2, there is illustrated an interface circuit 100 for connecting a RF antenna 105 to a RF according to an embodiment of the invention. The interface circuit comprises a first terminal 115 connected to the RF antenna 105, and a second terminal 120 connected to the Tx part 110 of the RF transceiver via a power amplifier 122. An inductive load (Lg) 125 is connected to the second terminal, and a first Single Pole Single Throw (SPST) switch 130 is adapted to connect the inductive load 125 to the first terminal 115. A resistive load Zc 135 is also connected to the second terminal 120 via a second SPST switch 140.

Here, the inductive load 125 comprises first 125a and second 125b inductors arranged in series. The Rx part 145 of the RF transceiver is then connected to a third terminal positioned between the first 125a and second 125b inductors. Here, the first element of the RX part 145 is a Low Noise Amplifier (LNA). If the input impedance is capacitive, the combination with 125a and 125b create a pseudo transmission line and thus, a broadband matching network.

Finally, a power detector 150 is connected to the second terminal 120.

It will be appreciated that the pseudo-transmission line property of the interface circuit 100 provides impedance matching and creates for each sub section a characteristic impedance Zc that is defined by the following equation (i):

$$Zc = \sqrt{\frac{Lg}{Cgs}}, \quad \text{(i)}$$

where the pseudo transmission lines are formed by integrating gate capacitance (Cgs) of the LNA input with the inductance Lg.

Figure 3:
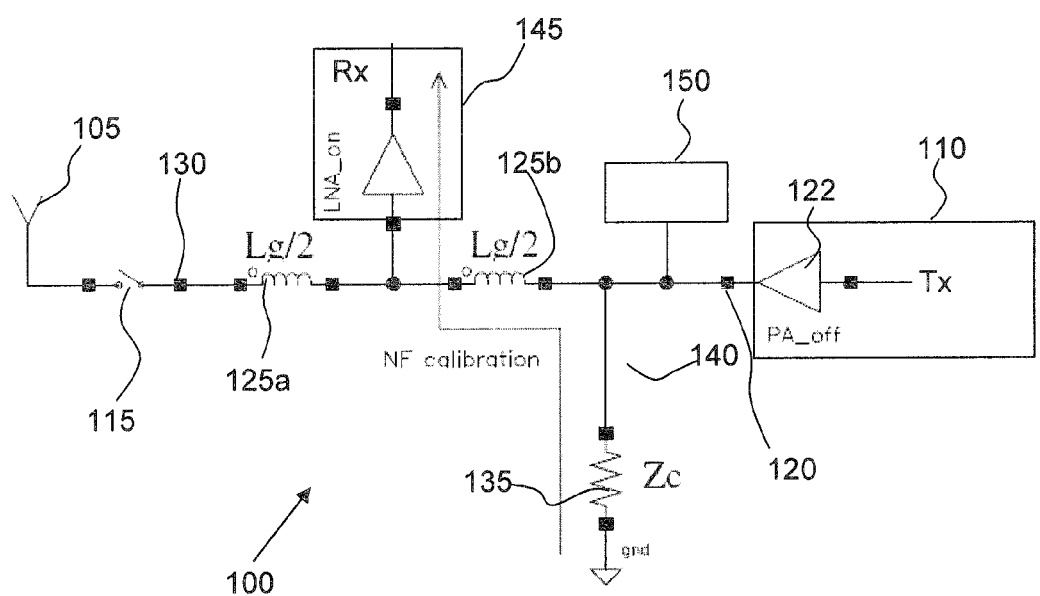
FIG. 3 shows an arrangement of the circuit of FIG. 2 for a reception mode of the RF transceiver.

The illustrated embodiment uses of Zc as load resistor to estimate $N_0$ of the receiver using a SPST switch 140 instead of SPDT. As shown in FIG. 3, for example, noise calibration can be achieved by arranging the first SPST switch 130 to disconnect the antenna 105 and further arranging the second SPST switch 140 to connect the load Zc 135 to the second terminal 120. The noise can then be calibrated on this load Z2 135. Also, the power detector 150 may be used to provide a variable gain property to the Rx part 145 of the RF transceiver to optimise the trade-off between noise and linearity.

Embodiments may be integrated into any front end radio to realize a SPDT in the case of half duplex transceiver. In addition, such an arrangement may also be used as a broadband power splitter (by replacing the TX by another Rx).

Embodiments may also be used for a TX broadband by allowing the connection of a different amplifier (e.g. optimized for a narrow band) to the broadband single antenna (by replacing the RX by another TX).

Thus, compared to the conventional approach, the embodiment of FIG. 2 is of a simplified design. Since there is no need of a SPDT switch in front of the LNA, the illustrated embodiment has less impact on the noise figure. Also, there is no need for a high level of isolation between the antenna and the load because the load is part of the matching network.

Figure 4:
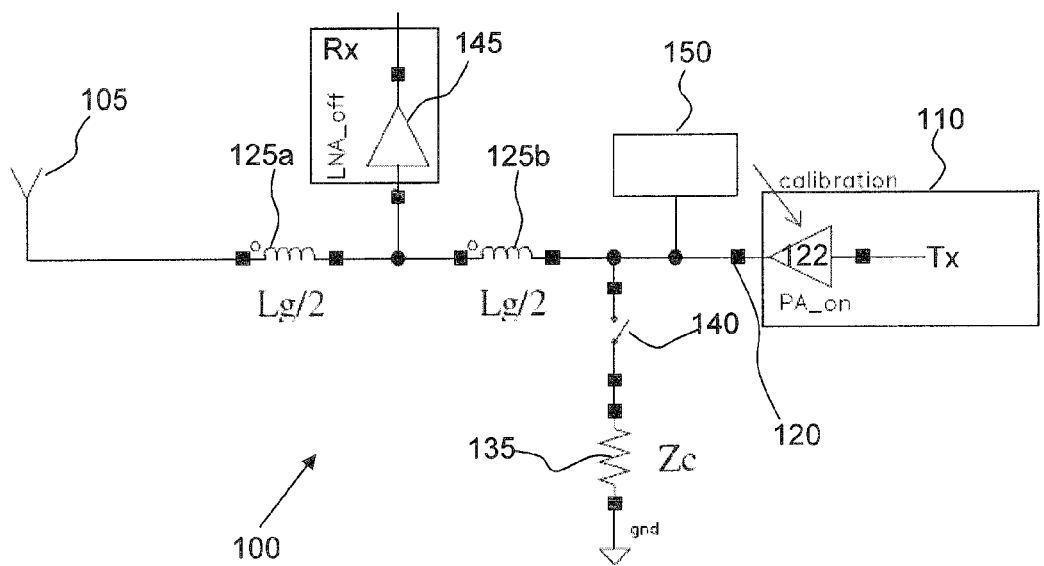
FIG. 4 shows an arrangement of the circuit of FIG. 3 for a transmission mode of the RF transceiver.

For the case of system communication based on half duplex pipes, the illustrated embodiment may provide the following additional benefits:

(i) The transmission part is connected at the end of the pseudo-line to create a transmission path without need of additional switch. This, again, has minimal impact on noise figure since no SPDT is required between the reception/transmission (Rx/Tx) paths. As illustrated in FIG. 4, in Tx mode, the second SPST switch 140 is switched off (i.e. left open) and disconnected to the end of pseudo line and replaced by the output of the Tx path.

(ii) A power detector for both Tx/Rx paths is provided without a switching element. As explained above in the background section, a power detector may be needed for output power calibration and adjustment during transmission. A power detector may also be required in the Rx path to provide a variable gain property to the Rx amplifier so as to optimize the trade off between noise and linearity. With the proposed approach, only a single power detector is employed.

Various modifications will be apparent to those skilled in the art.

For illustration purposes and simplified explanation, only one section of a pseudo line has been presented. It will be appreciated that the same approach could also be extended to N sections of pseudo line, where N is an integer greater than one.

The invention claimed is:

1. An interface circuit for connecting a RF antenna to a RF device comprising:
   a first terminal configured to connect to the RF antenna;
   a second terminal configured to connect to the RF device;
   an inductive load connected to the second terminal;
   a first switch configured to connect the inductive load to the first terminal; and
   a resistive load connected to the second terminal via a second switch.

2. The interface circuit of claim 1, wherein the RF device is a RF transceiver.

3. The interface circuit of claim 1, wherein the inductive load comprises a plurality of inductors connected in series.

4. The interface circuit of claim 1, wherein the first and second switches each comprise a single pole single throw switch.

5. The interface circuit of claim 1, further comprising:
   a power detector connected to the second terminal.

6. The interface circuit of claim 1, further comprising:
   a third terminal configured to connect to a further RF device, wherein the third terminal is connected to the first and second terminals via the inductive load.

7. The interface circuit of claim 6, wherein the further RF device is a RF transmitter.

8. An RF device comprising the interface circuit according to claim 1.

9. The interface circuit of claim 1, wherein the second terminal is configured to connect to a power amplifier in the RF device.

10. The interface circuit of claim 1, wherein the inductive load comprises a first inductor and a second inductor and a third terminal is positioned between the first inductor and the second inductor.

11. The interface circuit of claim 1, wherein the third terminal is configured to connect to a low noise amplifier in the further RF device.

* * * * *